(12) United States Patent
Chang et al.

(10) Patent No.: US 11,011,977 B2
(45) Date of Patent: May 18, 2021

(54) DUAL-STAGE INDUCTORLESS SWITCHED-CAPACITOR CONVERTER WITHOUT DIVISOR DEPENDENCY

(71) Applicant: Silego Technology Inc., Wilmington, DE (US)

(72) Inventors: Kevin Yi Cheng Chang, Chandler, AZ (US); Julian Tyrrell, Swindon (GB)

(73) Assignee: SILEGO TECHNOLOGY INC., Wilmington, DE (US)

( * ) Notice: Subject to any disclaimer, the term of this patent is extended or adjusted under 35 U.S.C. 154(b) by 41 days.

(21) Appl. No.: 16/588,795

(22) Filed: Sep. 30, 2019

(65) Prior Publication Data

US 2021/0099078 A1  Apr. 1, 2021

(51) Int. Cl.
*H02M 3/06* (2006.01)
*H02M 3/156* (2006.01)

(52) U.S. Cl.
CPC ............ *H02M 3/06* (2013.01); *H02M 3/156* (2013.01)

(58) Field of Classification Search
CPC ........ H02M 3/06; H02M 3/156; H02M 3/155; H02M 3/157; H02M 3/158
See application file for complete search history.

(56) References Cited

U.S. PATENT DOCUMENTS

| | | | | |
|---|---|---|---|---|
| 8,198,937 | B1 * | 6/2012 | Vilas Boas | H03F 3/45475 330/9 |
| 10,432,088 | B1 * | 10/2019 | Chang | H02H 7/1213 |
| 10,804,798 | B1 * | 10/2020 | Rizzolatti | H02M 3/07 |
| 2012/0092042 | A1 * | 4/2012 | Takei | G11C 27/02 327/94 |
| 2014/0048682 | A1 * | 2/2014 | Kim | H04N 5/378 250/208.1 |
| 2016/0094126 | A1 * | 3/2016 | Liu | H02M 3/07 455/73 |
| 2017/0047843 | A1 * | 2/2017 | Bawa | H02M 3/156 |
| 2017/0104480 | A1 * | 4/2017 | Eshel | H01L 27/14609 |
| 2018/0026528 | A1 * | 1/2018 | Xiong | H02M 3/07 323/312 |
| 2019/0115829 | A1 * | 4/2019 | Oporta | H02J 7/022 |
| 2019/0190376 | A1 * | 6/2019 | Xiong | H02M 7/12 |
| 2019/0305791 | A1 * | 10/2019 | Ali | H03M 1/1033 |
| 2020/0090777 | A1 * | 3/2020 | Ivanov | G11C 27/026 |

OTHER PUBLICATIONS

Xu, et al., "Voltage Divider and its Application in the Two-stage Power Architecture," Twenty-First IEEE Applied Power Electronics Conference and Exposition (APEC), 2006.
Hanh-Phuc Le, "Design Techniques for Fully Integrated Switched-Capacitor DC-DC Converters," IEEE, Journal of Solid State Circuits, vol. 46, No. 9, Sep. 2011, p. 2120.

(Continued)

*Primary Examiner* — Adolf D Berhane
(74) *Attorney, Agent, or Firm* — Haynes and Boone, LLP

(57) ABSTRACT

A switched-capacitor converter is provided that includes an intermediate voltage generator having a flying capacitor. A sampling and hold circuit samples a top plate voltage for the flying capacitor and samples a bottom plate voltage for the flying capacitor to form an output voltage for the switched-capacitor converter.

20 Claims, 5 Drawing Sheets

(56) References Cited

OTHER PUBLICATIONS

John F. Dickson, "On-Chip High-Voltage Generation in Integrated Circuits Using an Improved Multiplier Technique," IEEE Journal of Solid-State Circuits, vol., SC-11, No. 3, Jun. 1976.

Xun Liu, "Analysis and Design Considerations of Integrated 3-Level Buck Converters," IEEE Transactions on Circuits and Systems—I: Regular papers, vol. 63, No. 5, May 2016, pp. 671-682.

Sun, et al."High Power Density, High Efficiency System To-stage Power Architecture for Laptop Computers," 2006 37th IEEE Power Electronics Specialists Conference.

\* cited by examiner

DUAL-STAGE INDUCTORLESS SWITCHED-CAPACITOR CONVERTER WITHOUT DIVISOR DEPENDENCY

TECHNICAL FIELD

This application relates to switched-capacitor converters, and more particularly to an inductorless switched-capacitor converter without divisor dependency.

BACKGROUND

A switched-capacitor converter typically generates an output voltage that is inversely proportional to a divisor such as 1.5, 2, or 3. The switched-capacitor converter divides an input voltage by the divisor to form the output voltage. As compared to a buck converter, a switched-capacitor converter offers a number of advantages such as low cost (no inductor), ease of integration, high efficiency, and fast transient responses. But conventional switched-capacitor converters are limited by the fixed divisor relationship between its input and output voltages.

Accordingly, there is a need in the art for switched-capacitor converters without divisor dependencies between their input and output voltages.

SUMMARY

In accordance with a first aspect of the disclosure, a switched-capacitor converter is provided that includes: a first switching stage including a flying capacitor, wherein the first switching stage is configured in a first switching configuration during a first portion of a clock signal period to charge the flying capacitor with an input voltage and is configured in a second switching configuration during a second portion of the clock signal period to charge a switch node with the flying capacitor; and a sampling and hold circuit configured to couple the switch node to a sampling capacitor for a first sampling time during the second switching configuration and further configured to couple the switch node to the sampling capacitor for a second sampling time during the first switching configuration to form an output voltage for the switched-capacitor converter across the sampling capacitor.

In accordance with a second aspect of the disclosure, a switched-capacitor converter is provided that includes: a first switching stage including a flying capacitor, wherein the first switching stage is configured in a first switching configuration during a first portion of a clock signal period to charge the flying capacitor with an input voltage and is configured in a second switching configuration during a second portion of the clock signal period to charge a switch node with the flying capacitor; and a sampling and hold circuit configured to couple a top plate of the flying capacitor to a sampling capacitor for a first sampling time during the second switching configuration and further configured to couple a bottom plate of the flying capacitor to the sampling capacitor for a second sampling time during the first switching configuration to form an output voltage for the switched-capacitor converter across the sampling capacitor.

In accordance with a third aspect of the disclosure, a method for a switched-capacitor converter is provided that includes: charging a flying capacitor during a first switching configuration for an intermediate voltage generator for a first portion of a clock signal period; charging a switch node with the flying capacitor during a second switching configuration for the intermediate voltage generator for a second portion of the clock signal period; coupling a top plate for the flying capacitor to a sampling capacitor for a first sampling time during the second switching configuration for the intermediate voltage generator; and coupling a bottom plate of the flying capacitor to the sampling capacitor for a second sampling time during the first switching configuration for the intermediate voltage generator to develop an output voltage for the switched-capacitor converter across the sampling capacitor.

These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
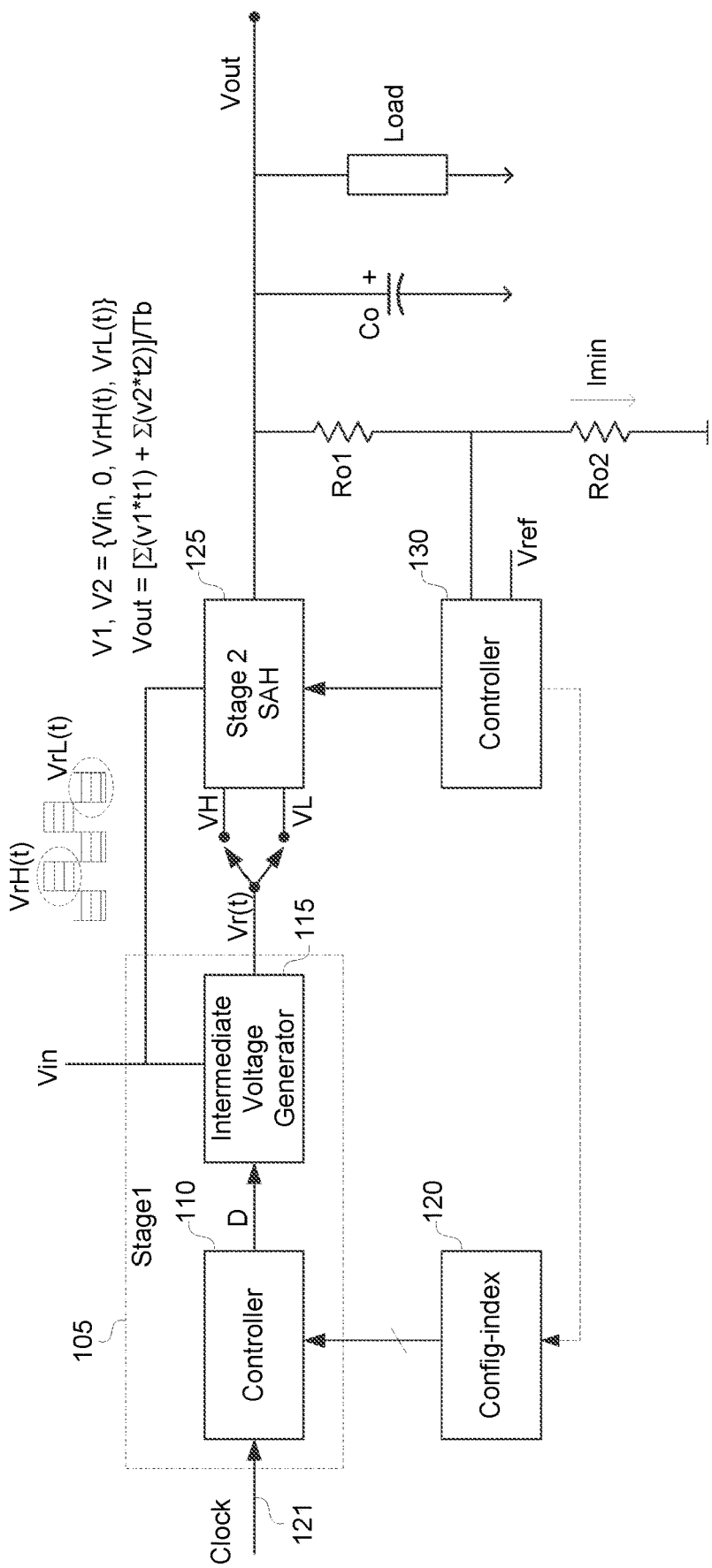
FIG. 1 is a diagram of an example switched-capacitor converter in which the output voltage does not have a divisor dependency in accordance with an aspect of the disclosure.

To eliminate the divisor dependency for its output voltage, a switched-capacitor converter is disclosed that includes a first stage and a second stage. The first stage may also be referred to as a power stage and includes four first switch transistors in series. A first one of the switch transistors connects between an input voltage rail for an input voltage and a second one of the switch transistors. The second switch transistor connects from the first switch transistor through a switching node to a third transistor. The third transistor couples to ground through the fourth transistor. A flying capacitor includes a top plate that connects to a node between the first and second switch transistors. Similarly, the flying capacitor includes a bottom plate that connects to a node between the third and fourth switch transistors. The following discussion will assume that the first and second switch transistors are PMOS switch transistors and that the third and fourth switch transistors are NMOS transistors, but it will be appreciated any suitable type of switch transistors may be used in alternative embodiments.

A power stage controller controls the switch transistors in the power stage to alternate between two configurations. In a first configuration, the first switch transistor and the third switch transistor are both on while the second switch transistor and the fourth switch transistor are both off. In this first configuration, an input voltage rail drives a top plate of the flying capacitor through the switched-on first switch transistor. The bottom plate of the flying capacitor drives the switching node through the switched-on third switch transistor. An output current thus flows from the input voltage rail through the flying capacitor to the switching node to charge the flying capacitor in the first configuration. In the second configuration, the second switch transistor and the fourth switch transistors are both on while the first switch transistor and the third switch transistor are both off. The flying capacitor thus discharges during the second configuration to charge the switching node.

The power stage controller controls a pulse width modulation of the two switching configurations so that the pulse widths are complementary. For example, if the duty cycle for the first switching configuration is D, the duty cycle for the second switching cycle will be approximately 1-D. To prevent an overlap between the two switching configurations, there is some dead time such that the two switching configurations are approximately complementary as compared to being exactly complementary. In the second switching configuration, the bottom plate of the flying capacitor is grounded whereas the top plate is being charged. Depending upon the duty cycle D, the top plate voltage will range from a low of Vin/2 to a high of Vin, wherein Vin is the input voltage on the input voltage rail. In particular, as D approaches one, the top plate voltage will approach Vin during the first switching configuration. In contrast, the top plate voltage will fall towards Vin/2 as D approaches zero.

Similarly, the bottom plate voltage will range between zero and Vin/2 during the first switching configuration. The switching node voltage (which is also denoted herein as the LX voltage) has a similar voltage profile to the top plate voltage during the first switching configuration and to the bottom plate voltage during the second switching configuration. By changing the duty cycle D, the power stage controller controls the voltages for the top plate, the bottom plate, and the switching node in the first switching configuration and in the second switching configuration.

The second stage is a sample-and-hold stage that samples and holds selected voltages from three nodes in the first stage: the top plate, the bottom plate, and the switching node. For example, the second stage samples and holds the top plate voltage during the first switching configuration and then samples and holds the bottom plate voltage during the second switching configuration. Alternatively, the second stage samples and holds the switching node voltage during the first switching configuration and then samples and holds the switching node voltage during the second switching configuration. To provide an output voltage that has no divisor dependency, the second stage mixes the resulting sampled voltages from the two switching configurations to produce an output voltage for the switched-capacitor converter. In a switched-node embodiment, only the switched node is selected for by the second stage, which is also denoted herein as a sample-and-hold stage or as a sample-and-hold circuit. In a flying-capacitor embodiment, the sample-and-hold stage samples and holds the top and bottom plate voltages from the flying capacitor. In a more general embodiment, the sample-and-hold stage may select between the flying capacitor plates and the switching node to provide the desired output voltage.

An example inductor-less switched-capacitor converter 100 is shown in FIG. 1. A power stage 105 includes a power stage controller 110 that controls the duty cycle D of the first switching configuration for a switched-capacitor intermediate voltage generator 115 and controls the complementary duty cycle of the second switching configuration for intermediate voltage generator 115. As will be explained further herein, intermediate voltage generator 115 is formed by the four switching transistors and the flying capacitor. A digital word denoted as the configuration index 120 (Config-index) sets the duty cycle as controlled by controller 110. The duty cycle D is defined with regard to a switching period for a clock signal 121.

A second stage for switched-capacitor converter 100 is formed by a sampling and hold (SAH) circuit 125. SAH circuit 125 samples and holds an intermediate voltage Vr(t) from intermediate voltage generator 115. This intermediate voltage can be sampled from the top plate of the flying capacitor, the bottom plate of the flying capacitor, or the switch node. Depending upon the switching configuration for intermediate voltage generator 115, the intermediate voltage will either be a high voltage VH that is above Vin/2 or will be a low voltage VL that is below Vin/2, where Vin is the input voltage for intermediate voltage generator 115. In general, SAH circuit 125 may not only sample and hold the VH and VL voltages but also can sample and hold the input voltage Vin and ground. The voltage sampled for a time t1 is denoted as V1 whereas the voltage sampled for a time t2 is denoted as V2. V1 and V2 are thus selected from the set consisting of Vin, ground, VH, or VL. The times t1 and t2 cannot be greater than the corresponding switching configuration duration for intermediate voltage generator 115. SAH circuit 125 samples and holds the voltage V1 for time t1 and samples and holds the voltage V2 for time t2. Based upon the sampling times t1 and t2 for SAH circuit 125 and the sampled voltages V1 and V2, an output voltage Vout as stored across an output capacitor Co is a function of a ratio of ((V1*t1) and V2*t2))/tb, where tb is the period for clock signal 121. A controller 130 controls the times t1 and t2 based upon a comparison of a reference voltage (Vref) to a feedback voltage such as obtained by dividing the output voltage through a voltage divider formed by a resistor Ro1 and a resistor Ro2. In some embodiments, controller 130 can also control the configuration index 120. In other embodiments, the configuration index 120 may be a fixed value. For example, D1 may be fixed to a 50% value in some embodiments.

Figure 2:
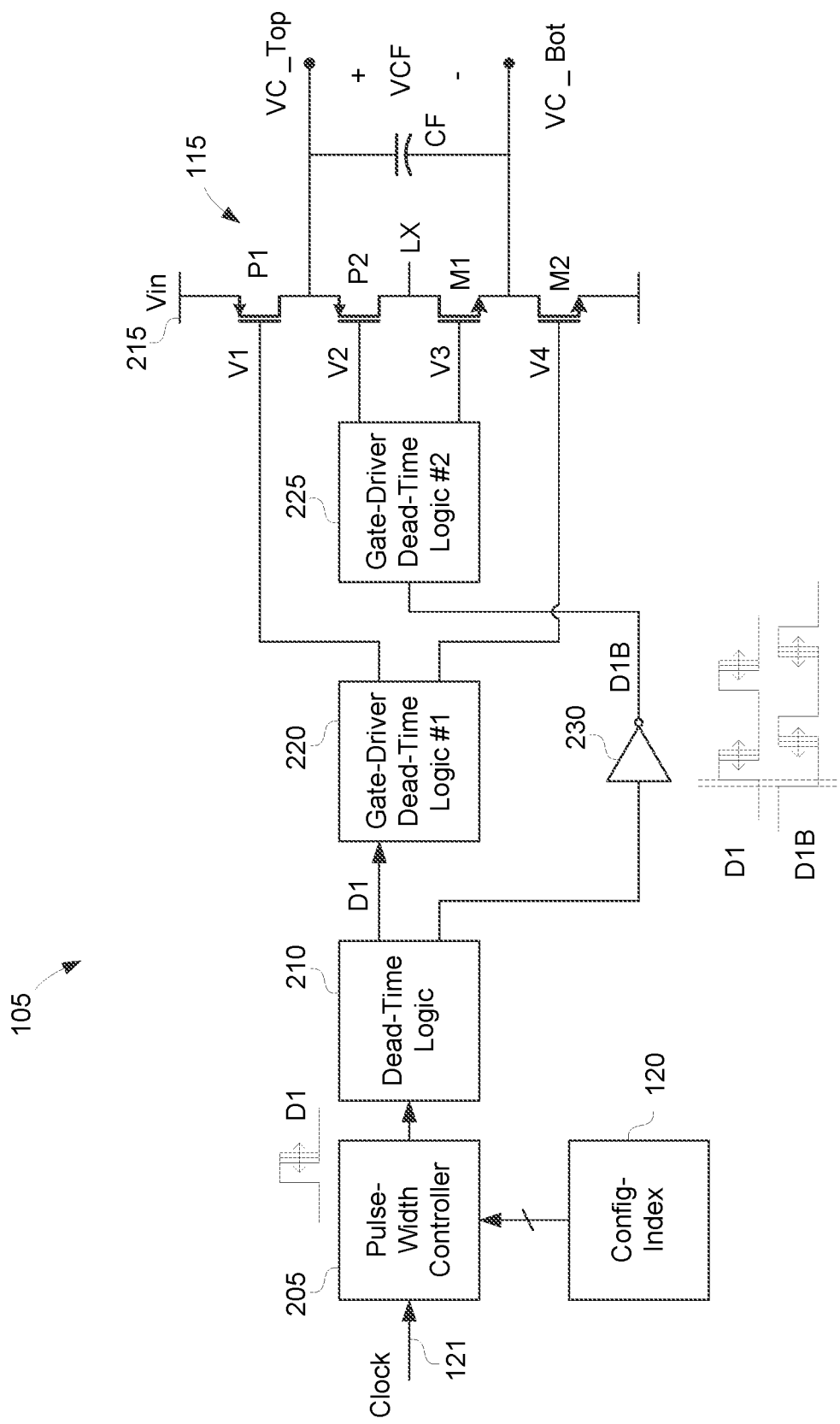
FIG. 2 is circuit diagram of an example first stage for a switched-capacitor converter in accordance with an aspect of the disclosure.

Power stage 105 is shown in more detail in FIG. 2. Power stage controller 110 includes a pulse-width modulator 205 that responds to the clock signal 121 and the configuration index 120 to generate the pulse width D1 for the first switching configuration. A dead-time logic circuit 210 ensures that there is a dead time between the first switching configuration and the second switching configuration.

Intermediate voltage generator 115 includes a PMOS first switching transistor P1 having a source connected to an input voltage rail 215 that carries the input voltage Vin. A drain for first switching transistor P1 connects to a top plate of the flying capacitor CF. The top plate voltage for flying capacitor CF is denoted as VC_Top. The drain for first switching transistor P1 also connects to a source for PMOS second switching transistor P2. The drain for second switching transistor P2 connects to the switch node LX and also to a drain for an NMOS third switching transistor M1. The source for third switching transistor M1 connects to the bottom plate of the flying capacitor CF having a bottom plate voltage denoted as VC_Bot. The source for third switching transistor M1 also connects to a drain for an NMOS fourth switching transistor M2 having a source connected to ground.

Intermediate voltage generator 115 also includes a first gate driver 220 that responds to the pulse width signal D1 to drive the gates of the first switching transistor P1 and the fourth switching transistor M2 accordingly. The first switching transistor P1 will thus be on when the pulse width signal D1 is asserted whereas the fourth switching transistor M2 will be off. Intermediate voltage generator 115 also includes a second gate driver 225 that responds to an inverted version D1B of the pulse width signal D1 as inverted by an inverter 230. In response to the inverted version D1B of the pulse width signal D1, second gate driver 225 drives the gates of second switching transistor P2 and third switching transistor M1. The third switching transistor M1 will thus be on while the pulse width signal D1 is asserted whereas the second switching transistor P2 will be off. The first switching configuration is thus selected while the pulse width signal D1 is asserted. When the pulse width signal D1 is de-asserted to ground, first switching transistor P1 and third switching transistor M1 will both be off while the second switching transistor P2 and the fourth switching transistor M2 will both be on. The second switching configuration is thus selected while the pulse width signal D1 is de-asserted.

Figure 3:
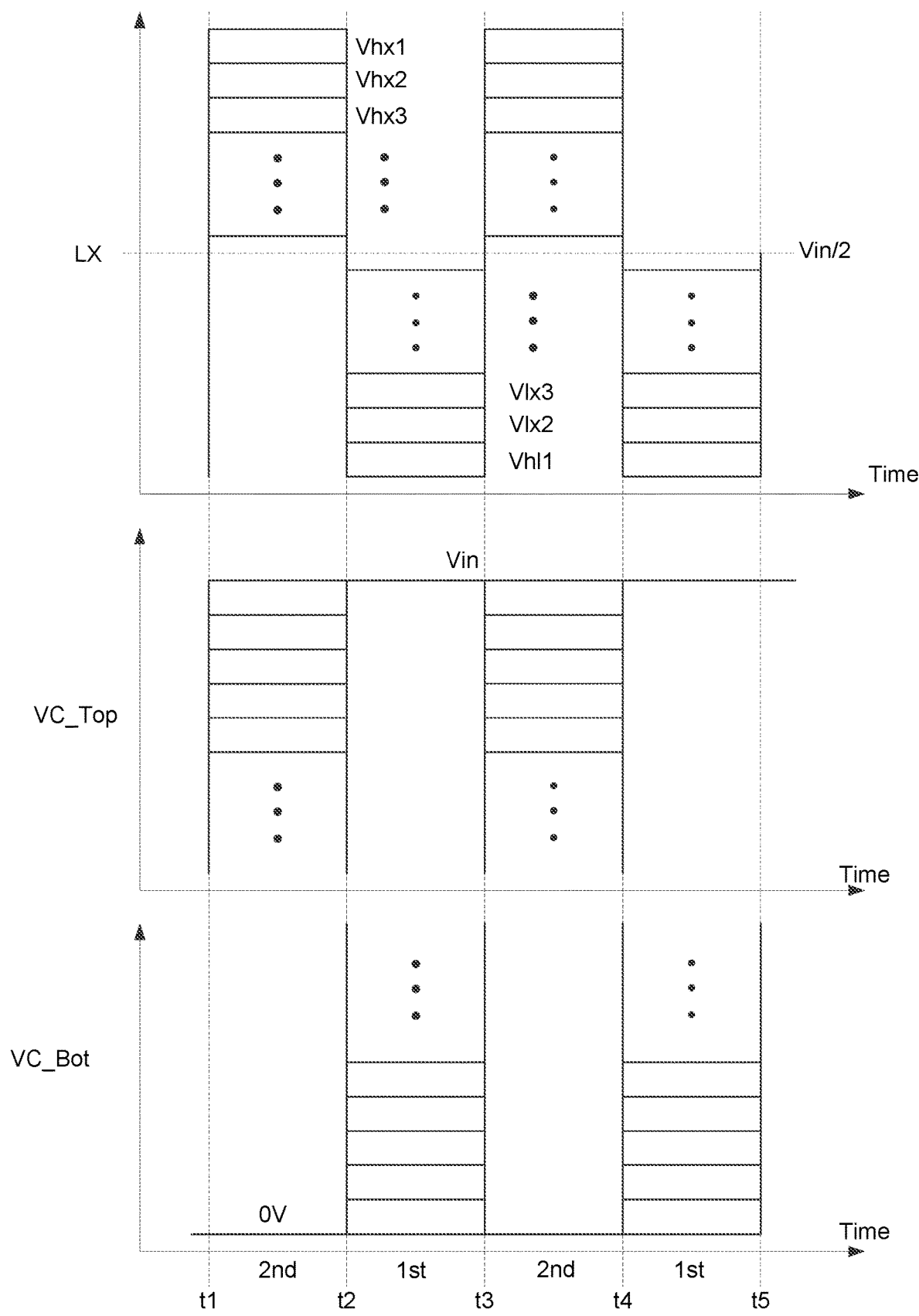
FIG. 3 illustrates some example top plate, bottom plate, and switching node voltages for the first stage of FIG. 2.

Some example waveforms for the switch node voltage LX, the top plate voltage VC_Top, and the bottom plate voltage VC_Bot are shown in FIG. 3. The second switching configuration is selected for starting from a time t1 to a time t2. Depending upon the pulse width D1, the top plate voltage VC_Top will range from a high value of Vin to a low value of Vin/2 during the second switching configuration. Since the second switching transistor P2 is on during the second switching configuration, the LX node voltage and the top plate voltage VC_Top are equal during the second switching configuration. Some example LX node voltages (which also equal the corresponding top plate voltages) during the second switching configuration are designated as Vhx1, Vhx2, and Vhx3. The bottom plate voltage VC_Bot is ground during the second switching configuration since the fourth switching transistor M2 is on. The second switching configuration is again repeated from a time t3 to a time t4.

The first switching configuration is selected for from time t2 to time t3. The top plate voltage VC_Top equals the input voltage Vin during this time. The bottom plate voltage VC_Bot ranges from Vin/2 to ground depending upon the pulse width D1. The switch node LX voltage equals the bottom plate voltage VC_Bot during the second switching configuration since the third switching transistor M1 is on. Some example voltages for the switch node LX voltage (which is also equal to the bottom plate voltage VC_Bot) are designated as Vlx1, Vlx2, Vlx3. The first switching configuration is repeated from time t4 to a time t5.

Figure 4:
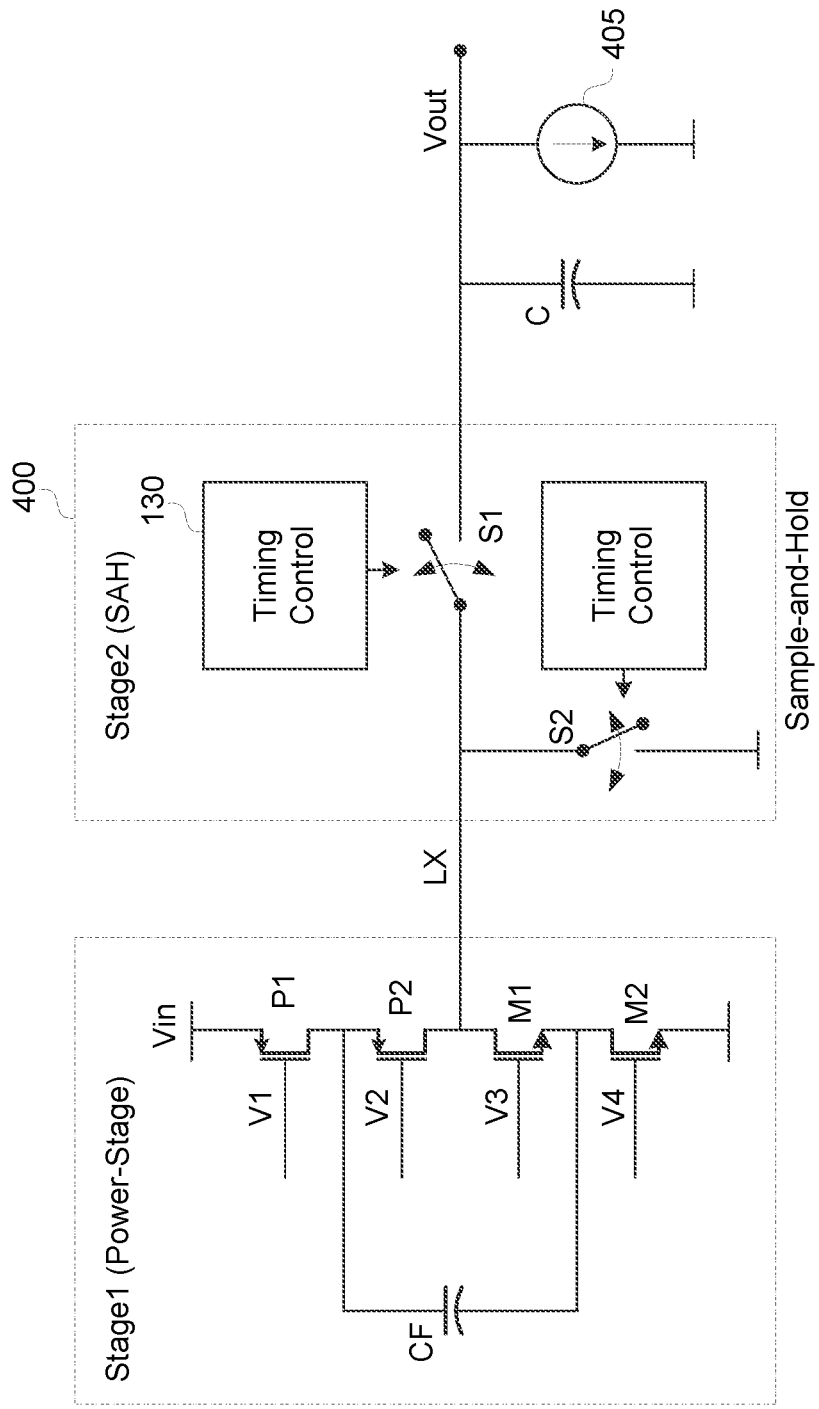
FIG. 4 illustrates a second stage embodiment in which the switching node voltage from the first stage is sampled in accordance with an aspect of the disclosure.

An example sampling and hold circuit 400 for sampling the LX node voltage is shown in FIG. 4. Intermediate voltage generator 115 is as discussed with regard to FIG. 2. SAH circuit 400 samples the LX node voltage to obtain the high voltage VH sample for time t1 during the second switching configuration for intermediate voltage generator 115. Similarly, SAH circuit 400 samples the LX node voltage to obtain the low voltage VL sample for time t2 during the first switching configuration for intermediate voltage generator 115. SAH circuit 400 samples the LX node voltage through a transistor switch 51 that is closed for the sampling times t1 and t2 as controlled through timing controller 130. The sampled voltage charges a sampling capacitor C that is reset through a current source 405. In some embodiments, SAH circuit 400 includes a second transistor switch S2 for resetting the LX node voltage as also controlled by timing controller 130.

Figure 5:
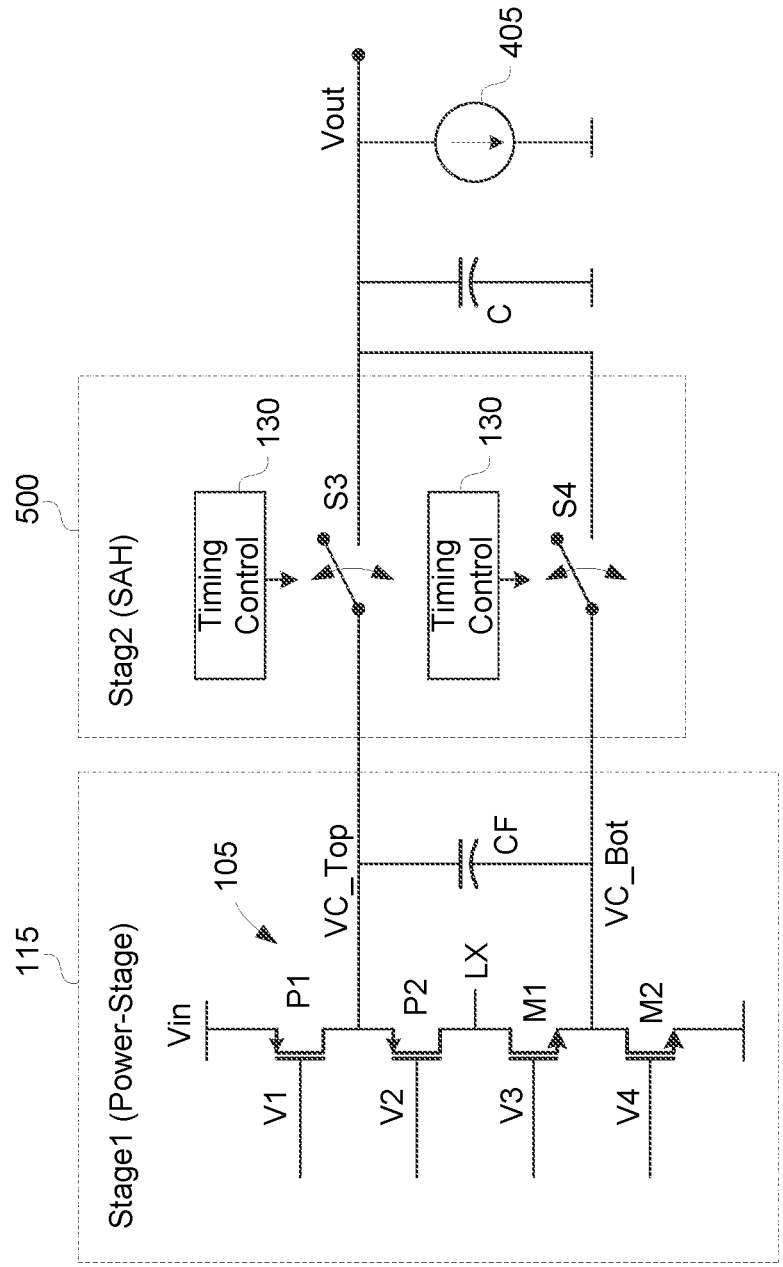
FIG. 5 illustrates a second stage embodiment in which the top and bottom plate voltages from the first stage are sampled in accordance with an aspect of the disclosure.

The sampling of the top and bottom plate voltages by a SAH circuit 500 is shown in FIG. 5. Intermediate voltage generator 115 is again as discussed with regard to FIG. 2. During the second switching configuration, timing controller 130 closes a transistor switch S3 for the sampling time t1 to couple the top plate of the flying capacitor to the sampling capacitor C. The top plate voltage VC_Top is thus sampled by SAH circuit 500 for the sampling time t1 during the second switching configuration of intermediate voltage generator 115. During the first switching configuration, timing controller 130 closes a transistor switch S4 for the sampling time t2 to couple the bottom plate of the flying capacitor to the sampling capacitor C. The bottom plate voltage VC_Bot is thus sampled by SAH ciruit 500 for the sampling time t2 during the first switching configuration of intermediate voltage generator 115.

Note that SAH circuits 400 and 500 are equivalent in that the LX node voltage and the top plate voltage VC_Top are equal during the second switching configuration for intermediate voltage generator 115. Similarly, the LX node voltage and the bottom plate voltage VC_Bot are equal during the first switching configuration for intermediate voltage generator 115. In both embodiments, the sampling time t1 is limited by the duration of the second switching configuration in that the sampling time t1 is not longer than the duration of the second switching configuration but may be shorter. Similarly, the sampling time t2 is not longer than the duration for the first switching configuration but may be shorter.

Those of some skill in this art will by now appreciate that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switched-capacitor converter, comprising:
    a first switching stage including a flying capacitor, wherein the first switching stage is configured in a first switching configuration during a first portion of a clock signal period to charge the flying capacitor with an input voltage and is configured in a second switching configuration during a second portion of the clock signal period to charge a switch node with the flying capacitor; and
    a sampling and hold circuit configured to couple the switch node to a sampling capacitor for a first sampling time during the second switching configuration and further configured to couple the switch node to the sampling capacitor for a second sampling time during the first switching configuration to form an output voltage for the switched-capacitor converter across the sampling capacitor.

2. The switched-capacitor converter of claim 1, further comprising:
    a controller configured to control a duration of the first sampling time and a duration of the second sampling time responsive to an error between the output voltage and a desired value for the output voltage.

3. The switched-capacitor converter of claim 1, wherein the first switching stage comprises:
    an input voltage rail for the input voltage;
    a first switch transistor having a source connected to the input voltage rail;
    a second switch transistor having a source connected to a drain of the first switch transistor;
    a third switch transistor having a drain connected to a drain of the second switch transistor; and
    a fourth switch transistor having a source connected to ground and having a drain connected to a source of the third switch transistor, wherein the flying capacitor has a top plate connected to the drain of the first switch transistor and has a bottom plate connected to the drain of the fourth switch transistor, and wherein the switch node is connected to the drain of the second switch transistor and to the drain of the third switch transistor.

4. The switched-capacitor converter of claim 3, wherein in the first switching configuration the first switch transistor and the third switch transistor are both on and the second switch transistor and the fourth switch transistor are both off, and wherein in the second switching configuration the first switch transistor and the third switch transistor are both off and the second switch transistor and the fourth switch transistor are both on.

5. The switched-capacitor converter of claim 4, wherein the sampling capacitor includes a first terminal connected to ground, and wherein the sampling and hold circuit further includes a fifth switch transistor coupled between the switch node and a second terminal of the sampling capacitor.

6. The switched-capacitor converter of claim 5, wherein the first switch transistor and the second switch transistor are both PMOS transistors, and wherein the third switch transistor and the fourth switch transistor are both NMOS transistors.

7. The switched-capacitor converter of claim 5, further comprising a controller configured to control a duration of the first switching configuration and a duration of the second switching configuration responsive to an error between the output voltage and a desired value for the output voltage.

8. A switched-capacitor converter, comprising:
a first switching stage including a flying capacitor, wherein the first switching stage is configured in a first switching configuration during a first portion of a clock signal period to charge the flying capacitor with an input voltage and is configured in a second switching configuration during a second portion of the clock signal period to charge a switch node with the flying capacitor; and
a sampling and hold circuit configured to couple a top plate of the flying capacitor to a sampling capacitor for a first sampling time during the second switching configuration and further configured to couple a bottom plate of the flying capacitor to the sampling capacitor for a second sampling time during the first switching configuration to form an output voltage for the switched-capacitor converter across the sampling capacitor.

9. The switched-capacitor converter of claim 8, further comprising:
a controller configured to control a duration of the first sampling time and a duration of the second sampling time responsive to an error between the output voltage and a desired value for the output voltage.

10. The switched-capacitor converter of claim 8, wherein the first switching stage comprises:
an input voltage rail for the input voltage;
a first switch transistor having a source connected to the input voltage rail;
a second switch transistor having a source connected to a drain of the first switch transistor;
a third switch transistor having a drain connected to a drain of the second switch transistor; and
a fourth switch transistor having a source connected to ground and having a drain connected to a source of the third switch transistor, wherein the top plate of the flying capacitor is connected to the drain of the first switch transistor and the bottom plate of the flying capacitor is connected to the drain of the fourth switch transistor, and wherein the switch node is connected to the drain of the second switch transistor and to the drain of the third switch transistor.

11. The switched-capacitor converter of claim 10, wherein in the first switching configuration the first switch transistor and the third switch transistor are both on and the second switch transistor and the fourth switch transistor are both off, and wherein in the second switching configuration the first switch transistor and the third switch transistor are both off and the second switch transistor and the fourth switch transistor are both on.

12. The switched-capacitor converter of claim 11, wherein the sampling capacitor includes a first terminal connected to ground, and wherein the sampling and hold circuit further includes:
a fifth switch transistor coupled between the top plate of the flying capacitor and a second terminal of the sampling capacitor; and
a sixth switch transistor coupled between the bottom plate of the flying capacitor and the second terminal of the sampling capacitor.

13. The switched-capacitor converter of claim 11, wherein the first switch transistor and the second switch transistor are both PMOS transistors, and wherein the third switch transistor and the fourth switch transistor are both NMOS transistors.

14. The switched-capacitor converter of claim 13, further comprising a controller configured to control a duration of the first switching configuration and a duration of the second switching configuration responsive to an error between the output voltage and a desired value for the output voltage.

15. A method for a switched-capacitor converter, comprising:
charging a flying capacitor during a first switching configuration for an intermediate voltage generator for a first portion of a clock signal period;
charging a switch node with the flying capacitor during a second switching configuration for the intermediate voltage generator for a second portion of the clock signal period;
coupling a top plate for the flying capacitor to a sampling capacitor for a first sampling time during the second switching configuration for the intermediate voltage generator; and
coupling a bottom plate of the flying capacitor to the sampling capacitor for a second sampling time during the first switching configuration for the intermediate voltage generator to develop an output voltage for the switched-capacitor converter across the sampling capacitor.

16. The method of claim 15, wherein charging the flying capacitor during the first switching configuration for the intermediate voltage generator for the first portion of the clock signal period comprises coupling the top plate of the flying capacitor to an input voltage rail and coupling the bottom plate of the flying capacitor to the switch node.

17. The method of claim 16, wherein charging the switch node comprises coupling the bottom plate of the flying capacitor to ground and coupling the top plate of the flying capacitor to the switch node.

18. The method of claim 15, further comprising:
adjusting a duration of the first sampling time and a duration of the second sampling time responsive to an error between the output voltage and a desired value for the output voltage.

19. The method of claim 15, wherein a duty cycle of the first switching configuration is 50%.

20. The method of claim 15, further comprising adjusting a duty cycle of the first switching configuration responsive to an error between the output voltage and a desired value for the output voltage.

* * * * *